United States Patent

[11] 3,557,978

| [72] | Inventor | Augusto Comelli<br>San Pietro a Ponti, Italy |
|---|---|---|
| [21] | Appl. No. | 752,234 |
| [22] | Filed | Aug. 13, 1968 |
| [45] | Patented | Jan. 26, 1971 |
| [73] | Assignee | Carlo Erba S. P. A.<br>Milan, Italy<br>a corporation of Italy |
| [32] | Priority | Feb. 14, 1968 |
| [33] | | Italy |
| [31] | | 2721 |

[54] SHEARING ARM FOR CUTTING FORAGE CONTAINED IN SILOS
4 Claims, 4 Drawing Figs.

[52] U.S. Cl. .................................................. 214/17, 74/240
[51] Int. Cl. .................................................. B65g 65/42
[50] Field of Search .......................................... 214/17.82; 198/171; 143/32; 299/82—84; 74/240

[56] References Cited
UNITED STATES PATENTS

| 3,035,718 | 5/1962 | Behlen | 214/17(.82) |
| 3,424,295 | 1/1969 | Wahl | 214/17(.82)X |
| 2,811,342 | 10/1957 | McCallum | 299/82 |

FOREIGN PATENTS

| 219,433 | 8/1957 | Australia | 299/82 |

Primary Examiner—Robert G. Sheridan
Attorney—Woodhams, Blanchard and Flynn

ABSTRACT: An improved shearing arm is disclosed for cutting forage contained in bottom discharge type silos, to be mounted in conjunction with the extraction channels located at the bottom of said silos, wherein the body consists of two elements, one upper and one lower, determining and limiting two couples of oppositely located seats, one for each branch of the chain of the arm, and the single pivots of the links of the chain, bearing the forage cutting blades, are guided, and hence the chain itself over its entire extent, said elements being mounted on the known means which govern the angular movement along the axis of the silo. The chain of this shearing arm is fully protected in its upper and lower parts, and partially on the sides.

PATENTED JAN 26 1971

3,557,978

INVENTOR
AUGUSTO COMELLI

BY Woodhams, Blanchard & Flynn
ATTORNEYS

SHEARING ARM FOR CUTTING FORAGE CONTAINED IN SILOS

The shearing arms of the known type and which cooperate with forage extractors in lower discharge type silos generally have the blade or hook chain mounted on the driving or return gears and consequently without protection of any kind with the result that the chain is constantly in contact with the forage in the silos in which the arms operate. This arrangement gives rise to abnormal operation of the system, due to frequent interference of the forage with the chain belt.

The object of this invention is an improved shearing arm for bottom discharge type silos and in which the chain carrying the cutting blades is guided over its entire length by two U-shaped seats, one upper and one lower, said seats being located in opposite positions with respect to each other and maintained on the same supporting means for the chain and to accomplish the same angular movements with respect to the center of the silos.

The purpose of the invention is to provide a shearing arm for silo with bottom discharge, and the chain of which is adequately protected over its entire length so as to eliminate any contact of the same with the forage and consequently any possibility of clogging and stoppage of the movement of the assembly.

With reference to the attached drawing in which.

Figure 1:
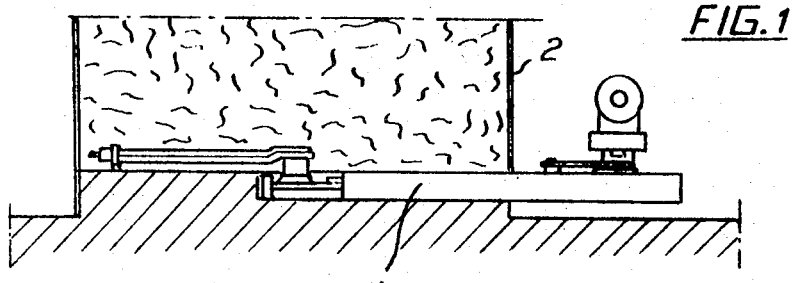
FIG. 1 is a partial schematic view of the bottom of a silos with shearing arm.
Figure 2:
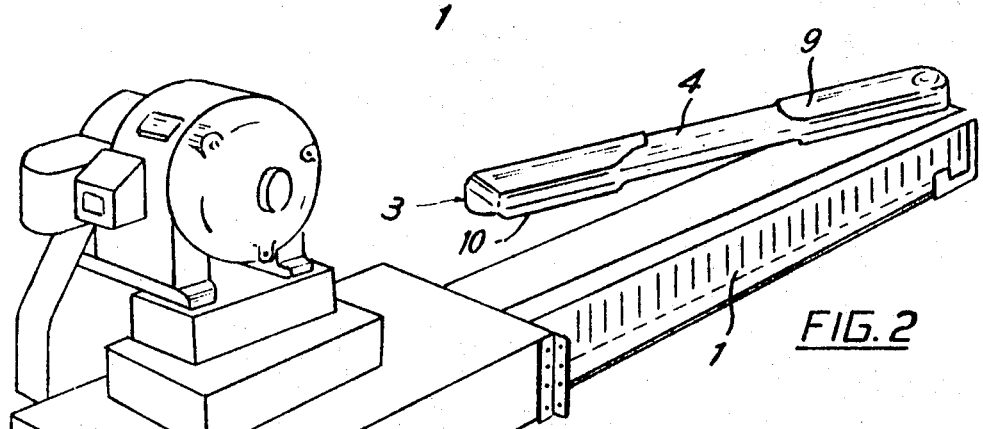
FIG. 2 is a perspective view of a forage extractor assembly with shearing arm.

The shearing arm under consideration which is mounted on the extremity of the extractor channel 1 (in the internal part of the silos) so as to cooperate with the same and result at the bottom of the silos 2 itself for storing forage, presents the endless chain 3, carrying cutting knives 4 for the forage, and said chain being suitably driven by a double gear 5 and in which the extremity of pivots 6 of the links are guided, over the entire length of the chain within looplike grooves, 7-7, 8-8, derived from two bodies 9-10 one upper and one lower, opposite to each other and adequately spaced so as to allow the free movement and shifting of the said cutting knives.

The chain 3 is of conventional construction in that it comprises a plurality of longitudinally spaced pivot pins 11, alternate pairs of which are pivotally interconnected by pairs of inner connecting links 12, the intermediate pairs of pivots 11 being further pivotally connected by pairs of outer connecting links 13. This type of chain construction is conventional and well known.

Figure 4:
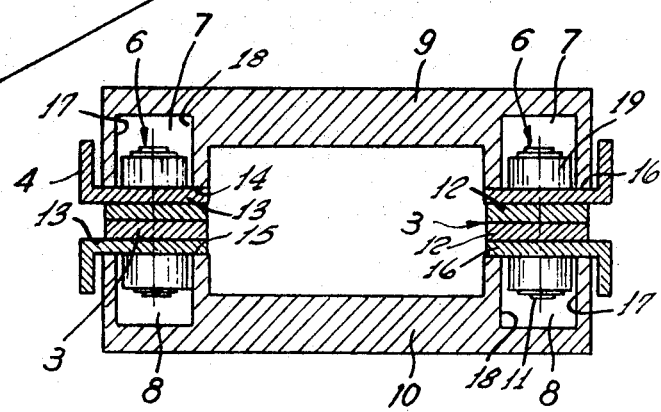
FIG. 4 is an expanded transversal section, taken from FIG. 3 in the direction of arrow IV–IV.
Figure 3:
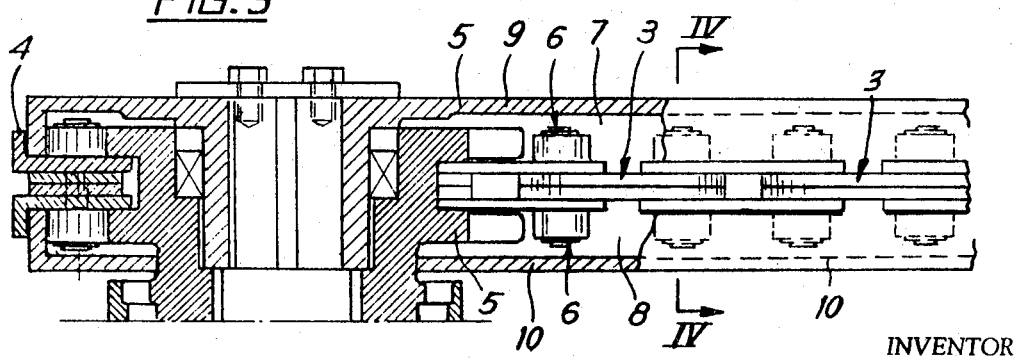
FIG. 3 shows the shearing arm in a partial longitudinal cross section.

However, as illustrated in FIG. 4, the outer links 13 are designed to slideably contact the channel-shaped bodies 9 and 10. Particularly, the legs of the channel members 9 and 10 having the grooves 7 and 8, respectively, therein have opposed planar faces 14 and 15, between which are positioned the pairs of links 12 and 13. The pairs of links 12 and 13 have an overall thickness approximately equal to the spacing between the faces 14 and 15, and the outer links 13 additionally have a width which is at least greater than the width of the grooves 7 and 8 so that the outer links 13 span across the width of the grooves, whereupon the outer links 13 have their outer surfaces 16 in bearing engagement with the surfaces 14 and 15, the outer links 13 being slideable along the surfaces 14 and 15 during movement of the chain. The opposed surfaces 14 and 15 thus provide a guide structure for the chain 3 over the complete length thereof for preventing undesired movement of the chain in a direction substantially parallel to the axes of the pivot pins 11. The close sliding fit between the chain links 13 and the guide surfaces 14 and 15 also substantially closes off the space between the channel members 9 and 10, thereby preventing forage from gaining access into the interior of the bodies 9 and 10.

The chain is further guided by the grooves 7 and 8, which grooves have opposed sidewalls 17 and 18 which closely confine the rollers 19 provided on the ends of the pivot pins 11. The rollers 19 are adapted to contact and rollingly engage the surfaces 17 or 18 for limiting or substantially preventing undesired lateral movement of the chain in a direction transverse to the axes of the pivot pins 11.

The guiding sidewalls 17 and 18, in conjunction with the opposed faces 14 and 15, thus effectively limit or prevent movement of the chain in two perpendicular directions, which two directions are also both transverse to the working length of the chain. These transverse guiding surface, namely, surfaces 18 or 19 and 14 or 15 thus prevent undesirable lateral movement of the chain whereupon the chain thus effectively moves solely in the desired longitudinal direction thereof.

The two bodies 9-10 with guiding seats for the chain pivots are integral with the known means to determine the angular movements of the arm so that the chain and/or bodies may perform the same angular movements with respect to the axis of the silos.

By virtue of the assembly as above described, bodies 9 and 10 which, together constitute the shearing arm provide an adequately protected chain over its entire length against any direct contact with the forage, yet allowing suitable operation of the blades for cutting the forage.

I claim:

1. A device for cutting and removing forage or the like from a silo, comprising:

an endless chain having peripheral knives or blades thereon, the chain comprising a plurality of longitudinally spaced pivot means and link means pivotally interconnecting adjacent pairs of said pivot means;

elongated housing means substantially enclosing and guiding said chain, said housing means including separable upper and lower boxlike housing members disposed in opposed relationship to one another and each having a substantially channel-shaped cross section extending over a major portion of the longitudinal length thereof;

each of said housing members including a base portion and a sidewall portion fixedly secured to and extending transversely outwardly from the respective base portion around substantially the complete periphery thereof, the sidewall portions of the upper and lower housing members being disposed opposite and closely adjacent one another;

said sidewall portions of said upper and lower housing members each having a ring-shaped groove formed therein with the grooves in said upper and lower housing members being disposed opposite and in communication with one another, each of said grooves having opposed substantially parallel sidewalls which define a pair of first guide surfaces;

the sidewall portions of said upper and lower housing members further having opposed end faces disposed substantially perpendicular to said first guide surfaces, said opposed end faces defining a pair of second guide surfaces with each of said second guide surfaces including first and second surface portions disposed laterally on opposite sides of the respective ring-shaped groove, said pair of second surfaces being spaced slightly apart so as to define an elongated annular opening therebetween for permitting the knives or blades to be positioned externally of the housing means;

said endless chain being disposed between said housing members and having at least a portion of said pivot means positioned within said opposed grooves and closely confined between the sidewalls thereof for substantially preventing lateral movement of the chain in a direction substantially transverse to the axes of said pivot means, said chain further having means thereon in slideable engagement with said pair of second guide surfaces for substantially preventing lateral movement of said chain in a direction substantially parallel to the axes of said pivot means; and toothed wheel means rotatably supported on said housing means adjacent the opposite ends thereof and disposed in meshing engagement with said chain for supporting and driving same.

2. The device according to claim 1, wherein said link means includes an inner link member pivotally interconnecting alternate pairs of said pivot means, said link means further including pairs of outer link members positioned laterally on opposite sides of said inner link members for pivotally interconnecting the intermediate pairs of pivot means, said pairs of outer link members having outer surfaces opposed to and in sliding engagement with said pair of second guide surfaces.

3. The device according to claim 2, including means for pivotally mounting said elongated housing means adjacent one end thereof for permitting horizontal angular displacement thereof.

4. A device according to claim 3, including an elongated extractor channel adapted to extend into the bottom of a silo, said housing means being pivotally mounted on said extractor channel adjacent one end thereof for horizontal angular displacement within the interior of the silo, and motor means disposed adjacent the other end of said extractor channel and adapted for disposition externally of the silo.